United States Patent
Aspen et al.

(10) Patent No.: US 9,803,656 B2
(45) Date of Patent: Oct. 31, 2017

(54) CONTROL APPARATUS FOR A WATER POWERED SUMP PUMP

(71) Applicant: A. Y. McDonald Mfg. Co., Dubuque, IA (US)

(72) Inventors: Randal S. Aspen, Oswego, IL (US); Tom W. Hast, Dubuque, IA (US)

(73) Assignee: A.Y. McDonald Mfg. Co., Dubuque, IA (US)

( * ) Notice: Subject to any disclaimer, the term of this patent is extended or adjusted under 35 U.S.C. 154(b) by 292 days.

(21) Appl. No.: 14/298,222

(22) Filed: Jun. 6, 2014

(65) Prior Publication Data

US 2015/0354602 A1    Dec. 10, 2015

(51) Int. Cl.
| | |
|---|---|
| F04F 5/48 | (2006.01) |
| F04F 5/52 | (2006.01) |
| F04F 5/02 | (2006.01) |
| F16K 31/385 | (2006.01) |
| F04F 5/10 | (2006.01) |

(52) U.S. Cl.
CPC ............... *F04F 5/48* (2013.01); *F04F 5/02* (2013.01); *F04F 5/10* (2013.01); *F16K 31/385* (2013.01)

(58) Field of Classification Search
CPC .................. F04F 5/10; F04F 5/48; F04F 5/52
USPC ............................................... 417/182.5
See application file for complete search history.

(56) References Cited

U.S. PATENT DOCUMENTS

| | | | | |
|---|---|---|---|---|
| 2,855,861 A | * | 10/1958 | Miles ..................... | F04F 5/461 |
| | | | | 417/182.5 |
| 3,215,089 A | * | 11/1965 | Hoffmann ............... | F04F 5/461 |
| | | | | 137/413 |
| 4,482,299 A | * | 11/1984 | Eulass ..................... | F04F 5/48 |
| | | | | 417/182.5 |
| 5,302,088 A | | 4/1994 | Gronski et al. | |
| 5,613,835 A | * | 3/1997 | Tyner ..................... | F16K 31/385 |
| | | | | 137/414 |

* cited by examiner

Primary Examiner — Peter J Bertheaud
(74) Attorney, Agent, or Firm — Wood, Phillips, Katz, Clark & Mortimer (57) ABSTRACT

A water powered sump pump (10) is provided and has a flow control apparatus (12) connected to a source of water under pressure and to a suction generator. The flow control apparatus (12) includes a control valve assembly (90) having a drain outlet (99) positioned to drain all or most of the water from the assembly (90). The sump pump (10) also includes an actuator assembly (98) for actuating the control valve assembly via a lever (114) that engages the assembly (90) and a float assembly (138).

10 Claims, 5 Drawing Sheets

CONTROL APPARATUS FOR A WATER POWERED SUMP PUMP

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

This invention relates to water powered pumps that are adapted for use in maintaining water in a sump at a selected level, and more particularly to a control mechanism for initiating and discontinuing a flow of water from a pressurized source to the pump.

BACKGROUND OF THE INVENTION

Water powered pumps have been employed in sumps in basements of residences and commercial buildings to prevent flooding of basements and the damage caused by such flooding. Sump pumps powered by pressurized water can eliminate requirements for electricity to sense water level and to power a motor that drives a pump. The complete elimination of electricity for sump pump operation is desirable because weather conditions which cause a rise in sump water level are likely also to cause electrical power failures.

Water powered pumps such as the pump shown in U.S. Pat. Nos. 5,302,088 and 5,613,835, the disclosures of which are incorporated herein by reference, work very well for discharging water from a sump. However, pump control systems that include a valve that is opened and closed by a float are subject to corrosion and mineral deposits on valve components that can occur over time, thereby increasing the force required to open and close such a valve. The force available from a float usable in a confined sump is limited. Corrosion and deposits on a float over time and leakage of water into floats can also change the force a float can produce. The increase in the force required to open or close a control valve and changes in the force available from a float can lead to a situation in which the float is incapable of either opening or closing a valve that controls the supply of water under pressure to a water powered pump. A sump pump which is not turned on when water level in a sump rises to a high level, or is not turned off when the water level in a sump falls below a chosen low level is unsatisfactory. Inspections and frequent maintenance can ensure the proper operation of a water powered sump pump. Unfortunately sump pumps are necessarily located in a sump where access for inspection and maintenance is difficult.

Conventional float actuated, water powered, sump pumps involve complex linkages with multiple components that increase the initial cost of the unit and complicate the maintenance of the unit, with each additional component complicating the problems of corrosion and mineral deposits discussed above.

Accordingly, while conventional float actuated, water powered, sump pumps may be suitable for their intended purpose, there is always room for improvement.

SUMMARY OF THE INVENTION

In accordance with one aspect of the invention, a water powered sump pump having a desired installed orientation in a sump is provided and includes a drain line locatable in a sump in which water may collect, an inlet port connectable to a source of water under pressure, a fluid outlet port in fluid communication with the drain line to draw a flow of water into the drain line from the pump in response to a flow of water from the fluid outlet port, and a flow control apparatus in communication with the inlet port and the outlet port to control flow from the inlet port to the outlet port. The flow control apparatus includes a passage connecting the inlet port to the outlet port, a flow valve moveable from a closed position in which the passage is closed to an open position in which the passage is open, with the flow valve being biased to the closed position, a variable pressure chamber separated from the passage by the valve, a low volume water passage in fluid communication with the inlet port and the variable pressure chamber, and a control valve in fluid communication with the variable pressure chamber. The control valve is moveable between an open position of the control valve wherein a water flow is allowed to exit the variable pressure chamber via the control valve thereby initiating movement of the flow valve from the closed position of the flow valve to the open position of the flow valve, and a closed position of the control valve wherein water cannot exit the variable pressure chamber via the control valve thereby initiating movement of the flow valve from the open position of the flow valve to the closed position of the flow valve. The control valve is mounted in a valve chamber for movement between the open and closed positions of the control valve, and the valve chamber is isolated from the variable pressure chamber with the control valve in the closed position. A drain outlet is located at a vertically lowermost position of the valve chamber to drain water from the valve chamber with the control valve in the closed position and the sump pump orientated in the desired installed orientation.

In accordance with one aspect of the invention, a water powered sump pump having a specific installed orientation in a sump is provided and includes a drain line locatable in a sump in which water may collect, an inlet port connectable to a source of water under pressure, a fluid outlet port in fluid communication with the drain line to draw a flow of water into the drain line from the pump in response to a flow of water from the fluid outlet port, and a flow control apparatus in communication with the inlet port and the outlet port to control flow from the inlet port to the outlet port. The flow control apparatus includes a passage connecting the inlet port to the outlet port, a flow valve moveable from a closed position in which the passage is closed to an open position in which the passage is open, with the flow valve being biased to the closed position, a variable pressure chamber separated from the passage by the valve, a low volume water passage in fluid communication with the inlet port and the variable pressure chamber, and a control valve in fluid communication with the variable pressure chamber. The control valve is moveable between an open position of the control valve wherein a water flow is allowed to exit the variable pressure chamber via the control valve thereby initiating movement of the flow valve from the closed position of the flow valve to the open position of the flow valve, and a closed position of the control valve wherein water cannot exit the variable pressure chamber via the control valve thereby initiating movement of the flow valve from the open position of the flow valve to the closed position of the flow valve. The sump pump further includes an actuator assembly including a pivotally supported actuator lever engaged with the control valve to actuate the control valve between the closed and open positions, the actuator lever mounted to pivot between a first position wherein the control valve moves to the closed position of the control valve in response to engagement with the actuator lever, and a second position wherein the control valve moves to the open position of the control valve in response to engagement with the actuator lever. The actuator lever is biased toward the first position with the actuator lever in the first position and biased toward the second position with the actuator lever in the second position. The actuator lever has a first portion engaged against the control valve and a second portion spaced from the first portion and configured for engagement with a float assembly to transmit force from the float assembly to actuate the actuator lever between the first and second positions. The actuator assemble further includes a bias member pivotably attached to the actuator lever and mounted for movement between a first bias position wherein the biasing member biases the actuator lever to the first position with the actuator lever in the first position and a second bias position wherein the biasing member biases the actuator lever to the second position with the actuator lever in the second position.

In one aspect, the water powered sump pump further includes an actuator assembly. The actuator assembly includes a pivotally supported actuator lever engaged with the control valve to actuate the control valve between the closed and open positions, with the actuator lever mounted to pivot between a first position wherein the control valve moves to the closed position of the control valve in response to engagement with the actuator lever, and a second position wherein the control valve moves to the open position of the control valve in response to engagement with the actuator lever. The actuator lever is biased toward the first position with the actuator lever in the first position and biased toward the second position with the actuator lever in the second position. The actuator lever has a first portion engaged against the control valve and a second portion spaced from the first portion and configured for engagement with a float assembly to transmit force from the float assembly to actuate the actuator lever between the first and second positions. The actuator assembly further includes a bias member pivotably attached to the actuator lever and mounted for movement between a first bias position wherein the biasing member biases the actuator lever to the first position with the actuator lever in the first position and a second bias position wherein the biasing member biases the actuator lever to the second position with the actuator lever in the second position.

As one feature, the control valve comprises a valve stem extending from the valve chamber and engaged against the first portion of the actuator lever.

According to one feature, the control valve is biased to the closed position of the control valve.

In one feature, the flow valve includes a diaphragm that isolates the variable pressure chamber from the passage.

According to one feature, the passage is defined by a first housing part, and the variable pressure chamber is defined by a second housing part fastened to the first housing part. In a further feature, the valve chamber is defined by the second housing part and by a third housing part engaged with the second housing part, with the third housing part defining a vertically lowermost portion of the valve chamber and including the drain outlet. In another feature, the actuator assembly is supported on the second housing part.

As one feature, the water powered sump pump further includes a water powered suction generating apparatus in communication with the fluid outlet port, the water powered suction generating apparatus responsive to flow of water from the fluid outlet port to create a low pressure sufficient to entrain water from the drain line and discharge water through a fluid discharge line.

In one feature, the water powered sump pump further includes a float assembly connected to the second portion of the actuator lever to pivot the actuator lever from the first position to the second position in response to a predetermined rise in a water level in a sump, and to pivot the actuator lever from the second position to the first position in response to a predetermined drop in the water level in the sump.

Other objects, features, and advantages of the invention will become apparent from a review of the entire specification, including the appended claims and drawings.

DETAILED DESCRIPTION OF THE PREFERRED EMBODIMENT

Figure 1:
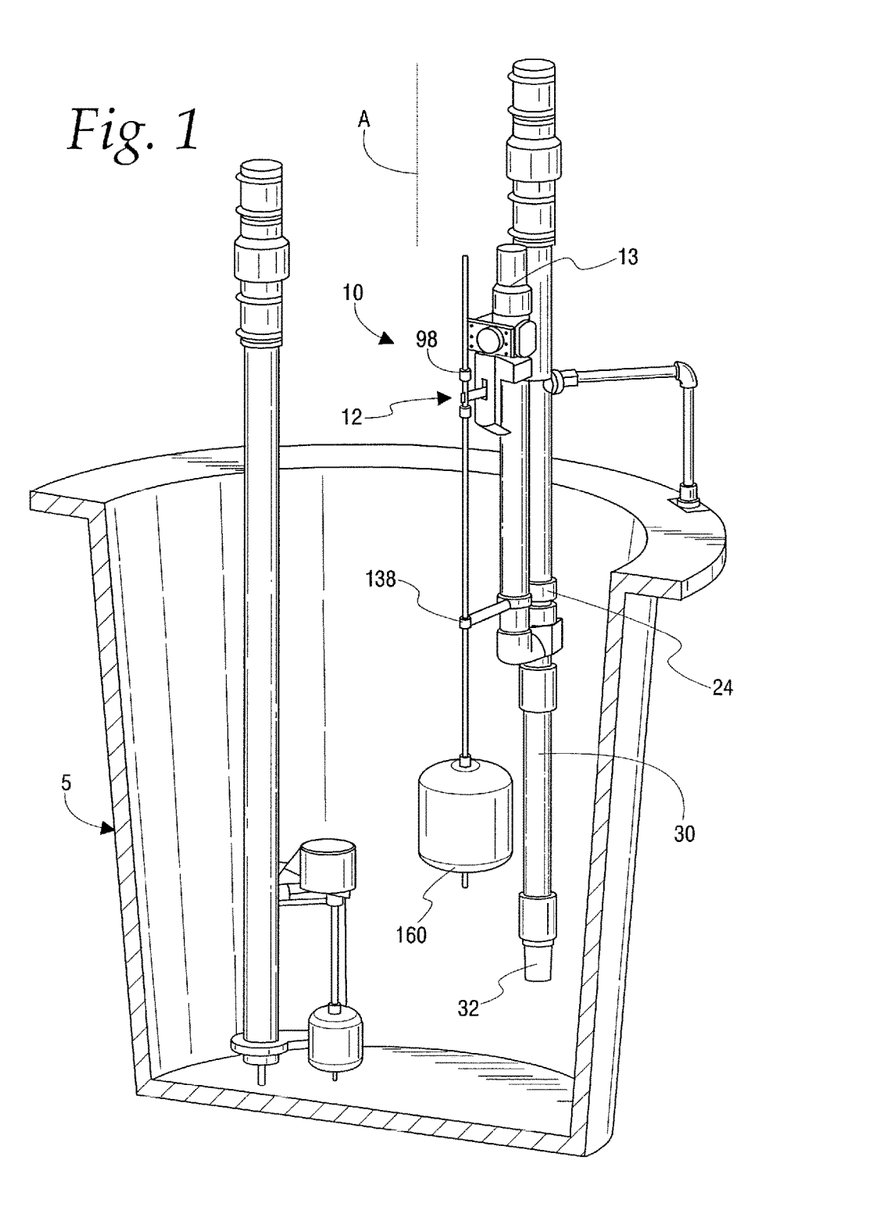
FIG. 1 is a partially broken, perspective view of a float actuated, water powered, sump pump as installed in a sump and including a flow control apparatus according to the invention.

A sump pump 10 is shown in FIG. 1 and includes a flow control apparatus 12 according to the invention. As seen in FIG. 1, the sump pump 10 has a desired installation orientation with the majority of the elongate fluid conduits of the illustrated sump pump 10 extending along vertical axes with respect to gravity (as indicated by axis A). The sump pump 10 includes a fluid inlet line 13 connected to a source (not shown) of water under pressure, such as a potable water system of a municipality. Typically, the pressure of the potable water supply is between 25 and 80 psi. Inlet line 13 may receive water that has passed through a conventional check valve, or may include a conventional check valve, such as shown at 14 in FIG. 2A, that permits water to flow to the flow control apparatus 12, but precludes return flow from the flow control apparatus 12.

The inlet line 13 is connected to an inlet port 16 of a housing 18 of the flow control apparatus 12. The housing 18 has an outlet port 20 that is connected to an inlet 22 (see FIG. 2B) of a suction generating apparatus 24 by water outlet line 26. The suction generating apparatus 24 has a sump inlet port 28 connected to a drain line 30 and a strainer 32 through which water from a sump S passes when it is drawn into the drain line 30. The suction generating apparatus 24 also has a discharge port 34 connected to a discharge line 36 which leads to a sewer or other area for disposal.

The control apparatus housing 18 comprises a first housing part or body 38 having the inlet port 16, the outlet port 20 and a cylindrical partition 40 separating the inlet port 16 from the outlet port 20. A circular opening 42, in communication with the inlet port 16, is encircled by a valve seat 44. A passage 46 connects the opening 42 to the outlet port 20 and includes the opening 42. A second housing part or cap 48 is removably secured to an open side of the body 38 by a plurality of suitable fasteners, such as bolts 50 (only one shown in FIG. 2A). The confronting ends of the body 38 and the cap 48 are recessed to form an annular groove 52 that is concentric with the seat 44.

Figure 2A:
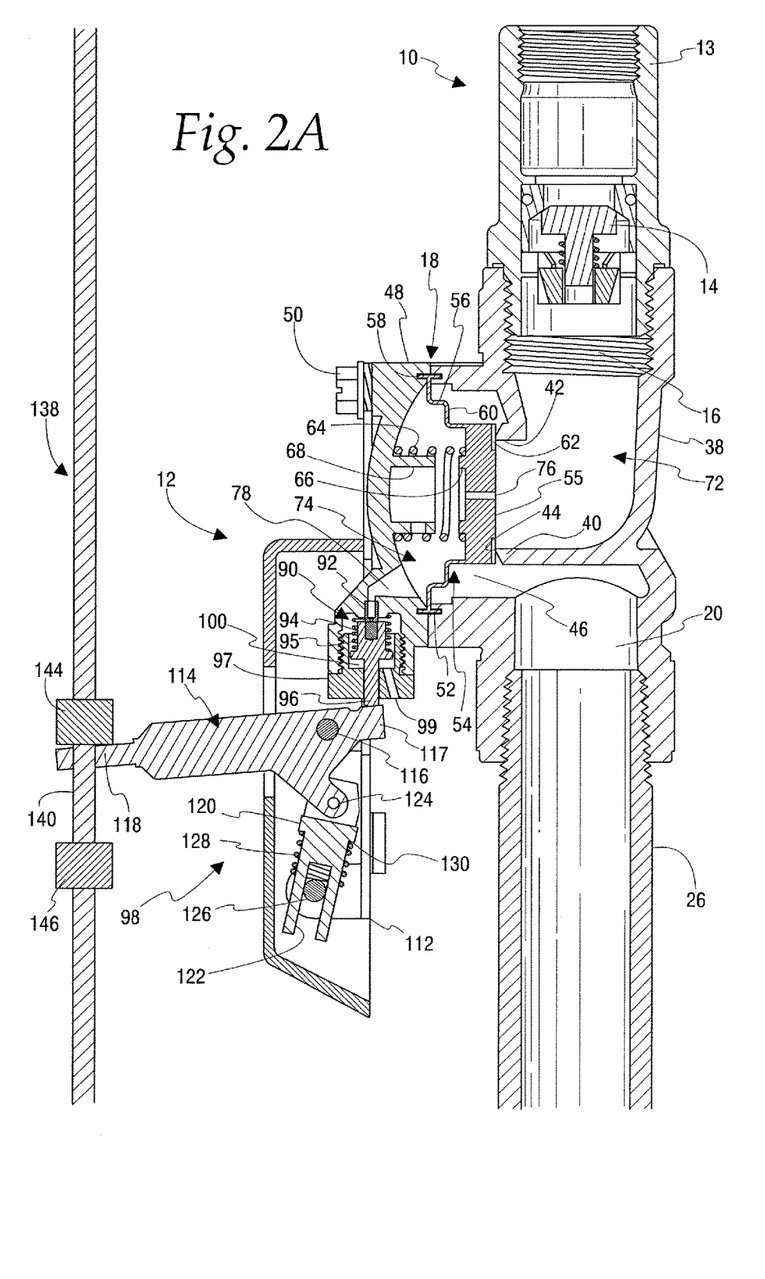
FIGS. 2A and 2B are enlarged partially cross-sectional views taken along line 2-2 in FIG. 1, with FIG. 2A showing a flow control apparatus and actuator therefor in a closed position according to the invention and FIG. 2B (less enlarged than FIG. 2A) showing a lower part of the sump.

A valve 54 normally seals the circular opening 42 and blocks the flow of water from the inlet port 16, through the passage 46 via the opening 42 to the outlet port 20. In the illustrated embodiment, the valve 54 includes a valve head 55, a flexible diaphragm 56 having a web 60 extending from the head 55 to the annular groove 52, and a peripheral enlargement 58 secured in the annular groove 52. The head 55 has a gasket 62 which seats on the valve seat 44. A compression spring 64 acts on the head 55 and the cap 48 to urge the valve head 55 into contact with the valve seat 44 and prevent flow between the inlet port 16 and the outlet port 20. One end of the spring 64 seats on an annular flange 66 formed on the head 55 and the opposite end of the spring 64 encircles a cylindrical guide 68 formed on the cap 48. The force exerted by the spring 64 is sufficient to maintain the valve 54 in sealing contact with the seat 44 when pressure on opposite sides of the diaphragm 56 is substantially equal.

The diaphragm 56 divides the interior of the housing 18 into two compartments. One compartment 72 includes the inlet port 16, outlet port 20, and the passage 46 whereas the other compartment 74 contains the spring 64. The compartment 72 is at water supply pressure and will be referred to as the uniform pressure compartment 72. The compartment 74 will be referred to as the variable pressure compartment 74.

In the illustrated embodiment, the valve head 55 has a relatively low volume passage or orifice 76 which provides fluid communication between the uniform pressure compartment 72 and the variable pressure compartment 74. When the compartment 74 is sealed from the outside environment, the pressure in the uniform pressure compartment 72 and the variable pressure compartment 74 will equalize due to water flow through the orifice 76, and the spring 64 will maintain the valve head 55 in sealing contact with the seat 44. Since the area of the valve 54 in communication with the uniform pressure compartment 72 is smaller than the area of the valve 54 in communication with the variable pressure compartment 74 with the valve 54 in the closed position, water pressure also will tend to maintain sealing contact between the seat 44 and the valve head 55.

While preferred forms of the components and features 18-74 have been described above, it should be understood that other suitable constructions can be used and are anticipated within the scope of the invention, including, for example, similar such components and features disclosed in U.S. Pat. No. 5,613,835.

Figure 3:
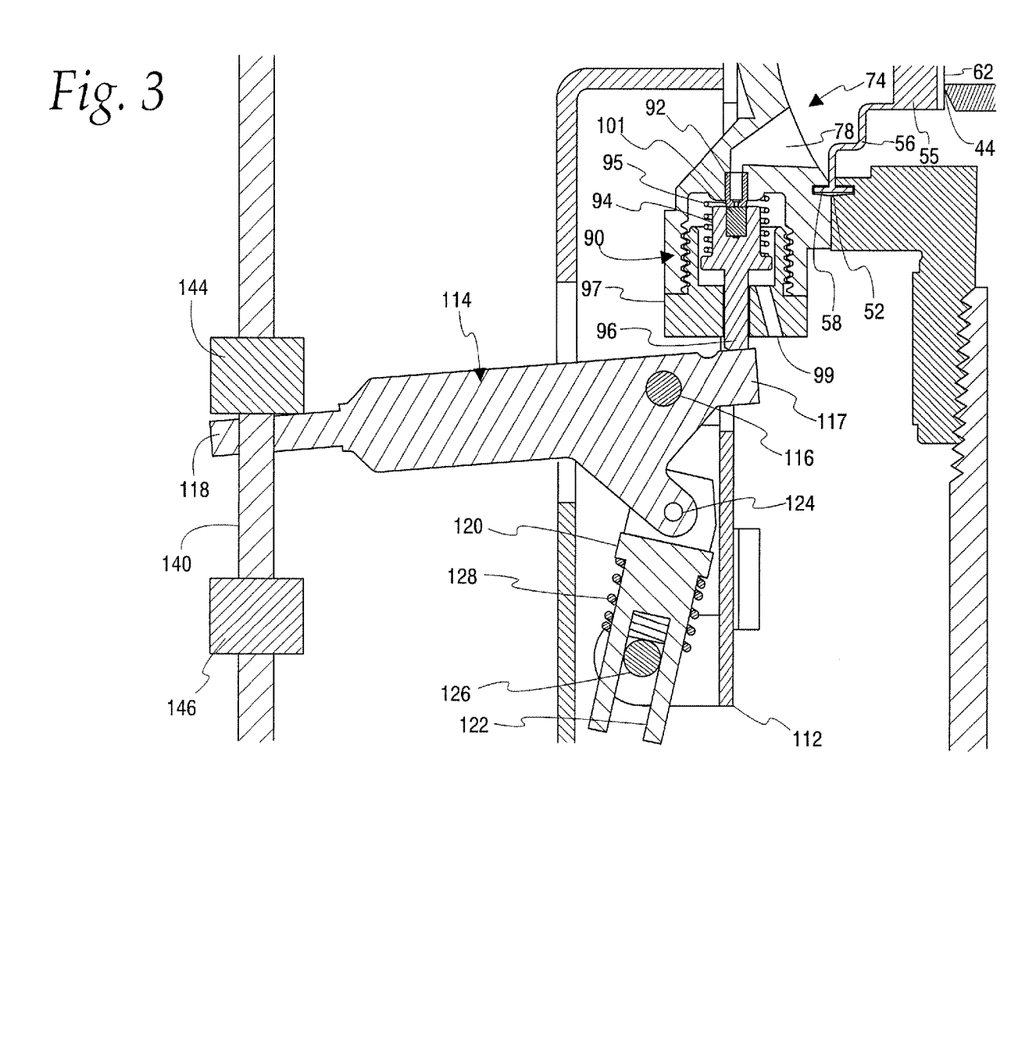
FIG. 3 is an enlarged view of a portion of FIG. 2A.
Figure 4:
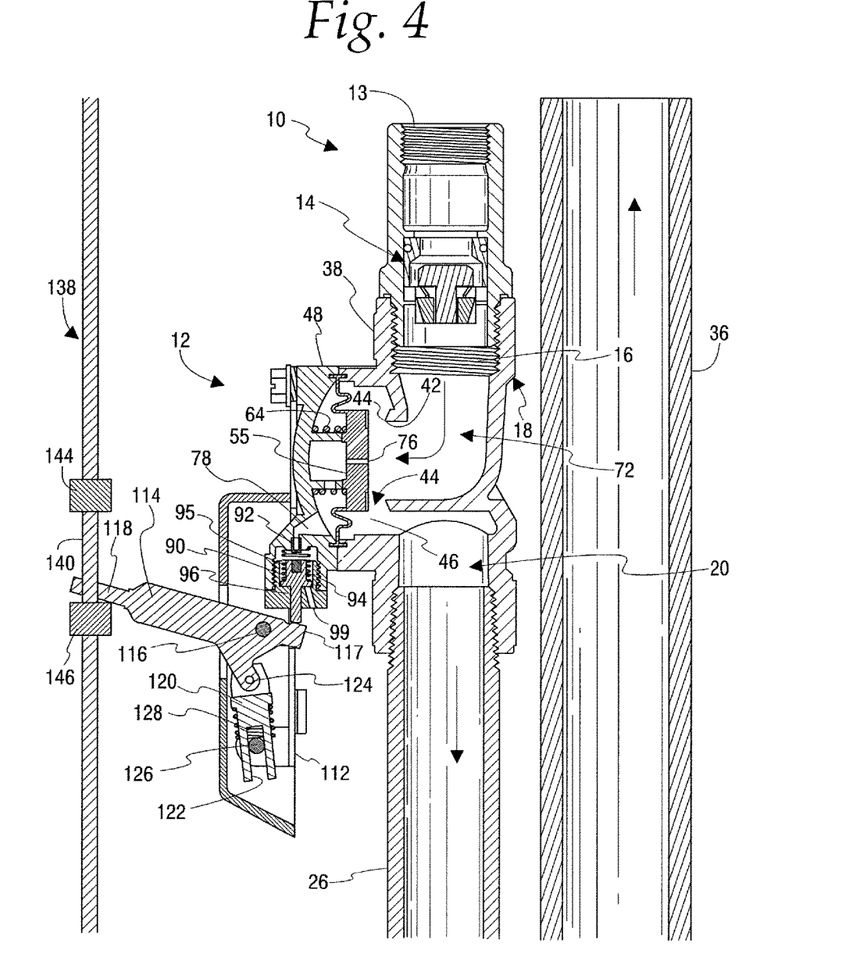
FIG. 4 is a view similar to FIG. 2A, but showing the flow control apparatus and actuator in an open position.

A bleed passage 78 is provided in the cap 48 of the flow control apparatus 18 for bleeding water from the variable pressure compartment 74. A control valve assembly 90 includes a fixed valve seat 92 in fluid communication with the bleed passage 78, and an axially moveable control valve 94 that, in the illustrated embodiment, is biased away from the seat 92 by a spring 95. In the illustrated embodiment, the valve 94 includes a stem 96 that extends out of a third housing part or fitting 97, as shown in FIG. 3, for engagement with an actuator assembly 98 (described below), which engages the stem 96 to actuate the valve 94 between a closed position (shown in FIGS. 2A and 3) and to an open position (shown in FIG. 4). In this regard, the valve stem 96 is slidably received within the fitting 97 for translation along a vertical axis with the sump pump 10 oriented in its desired installation orientation shown in FIG. 1. The control valve assembly 90 includes a drain passage or outlet 99 formed in a lower most part of the control valve assemble to drain all or most of the water from the assembly 90 with the valve 94 in the closed position, In the illustrated embodiment, the passage 99 is formed in the fitting 97. In the open position, the valve 94 separates from the valve seat 92 thereby opening the passage 78 and establishing fluid communication between the bleed passage 78 and atmosphere via a valve compartment 100 defined by the fitting 97 and the second housing part 38 and containing the valve 94. Optionally, the valve 94 may include a gasket plug 101 for engagement with the seat 92.

When the valve 94 is in the open position, water is bled from the variable pressure compartment 74 through the bleed passage 78 faster than water flows through the orifice 76 in the valve head 55 thereby lowering pressure in the variable pressure compartment 74. The water that passes through the valve assembly 90 and falls into and is mixed with the water in the sump S in which the sump pump 10 is mounted. The pressure of water in the uniform pressure compartment 72 will exert a force on the flow valve 54 that exceeds the force exerted on the valve 54 by water pressure in the variable pressure compartment 74 and by the spring 68, whereupon the valve head 54 will be lifted off the seat 44. Furthermore, upon the valve head 54 being lifted off the seat 44, water will flow from the compartment 72 through the passage 46 and through the outlet port 20. Upon the valve head 54 being lifted from the seat 44, the area of the valve head 54 in contact with water under pressure from the uniform pressure compartment 72 increases thereby increasing the force holding the flow control apparatus open until the control valve 94 is returned to its closed position and the pressure of water in the pressure compartments 72 and 74 equalizes enabling the spring 68 to move the valve head 54 against the seat 44.

Figure 2B:
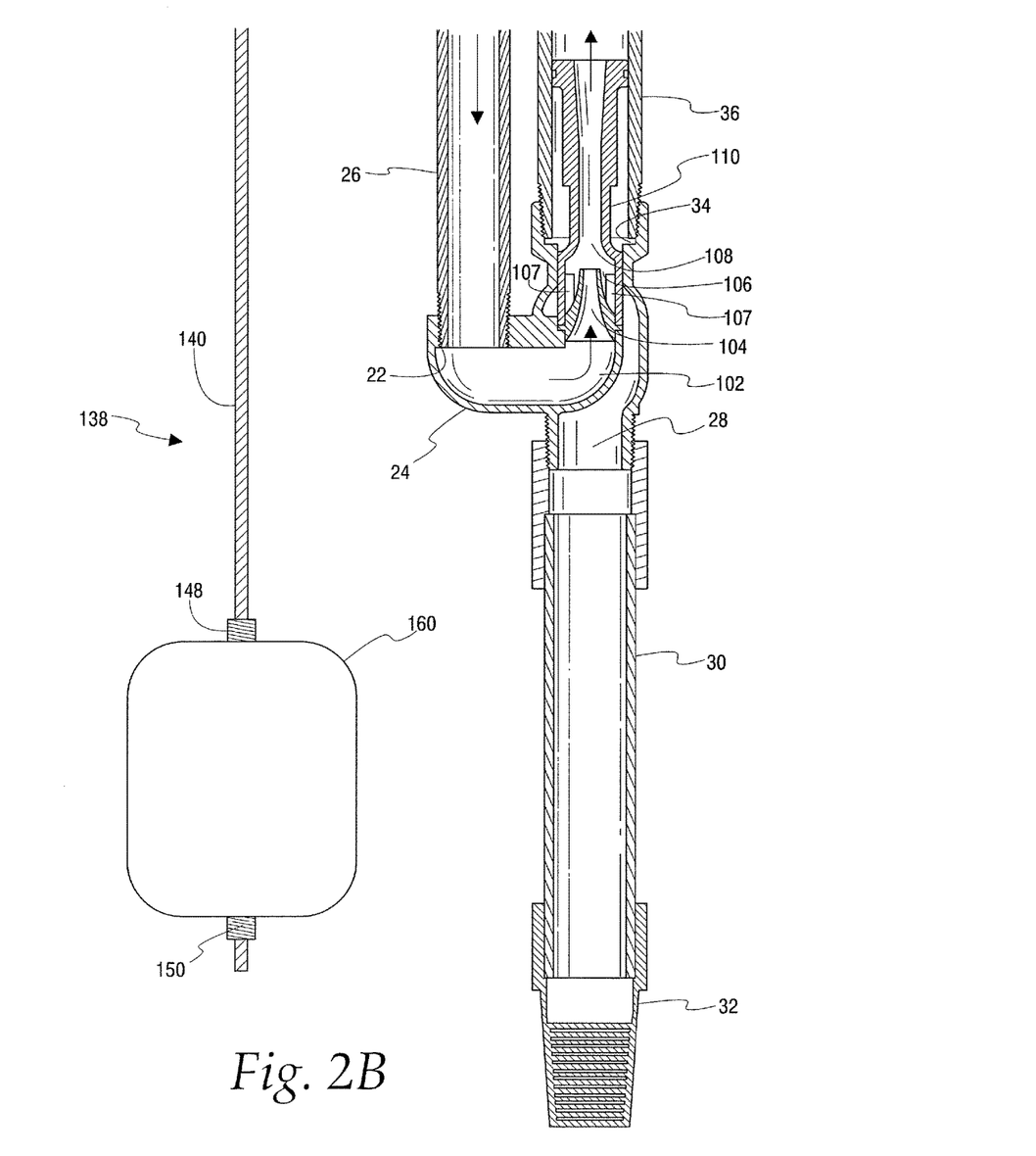

In the illustrated embodiment, the water discharged from the outlet port 20 of the flow control apparatus 18 flows to the suction generating apparatus 24 through a water outlet line 26. Water passes through a nozzle inlet chamber 102, and is discharged from the chamber 102 at a high velocity through a nozzle 104. The high velocity stream of water leaving the nozzle 104 passes through a low pressure suction chamber 106 and into a passage 108 through an injector 110. The axis of the passage 108 through the injector 110 is in alignment with the axis of water leaving the nozzle 104 at high speed. Pressure in the suction chamber 106 is reduced and water in the sump is drawn through the strainer 32, the drain line 30, and into the suction chamber 106 via openings 107. Water drawn into the suction chamber 106 is entrained in the high velocity stream of water leaving the nozzle 104 and carried through the injector 110. Water leaving the injector 110 is forced through the discharge line 36 to a sewer or other disposal area.

While preferred embodiments have been described above for the components and features 22-36 and 102-107, it should be understood that other suitable water powered suction devices can be used and are anticipated within the scope of the invention. Again, U.S. Pat. No. 5,613,835 shows one example of such a suitable construction.

The actuator assembly 98 for opening and closing the valve 94 includes an actuator assembly bracket or switch plate 112 that can either be integral with the housing 18

(either part 38 or part 48) or secured to the housing 18 by suitable fasteners, such as the bolt shown in FIG. 2A. An actuator lever 114 is pivotally attached to a pivot shaft or pin 116 on the switch plate 112. The actuator lever 114 has a first portion 117 that engages against the stem 96 of the valve 94, and a second portion 118 that is configured to engage a float assembly on an opposite end of the actuator lever 114 from the first portion 117. In the illustrated embodiment, the pivot 116 is located so that the force applied to the actuating lever 114 at the second portion 118 is a multiple of the force applied to the actuating lever 114 at the first portion 117. A bias member or link 120 with a slot 122 is pivotally attached to the lever 114 by a pin 124, with a pin 126 fixed in the switch plate 112 received in the slot 122. A compression spring 128 surrounds a cylindrical shaft of the bias member 120 and is seated against the pin 126 and a shoulder 130 of the bias member 120. In the position shown in FIGS. 2A and 3, the compression spring 128 biases the lever 114 counter-clockwise about the pivot shaft 116 into contact with the stem 96 of the control valve 94 thereby forcing the valve 94 to close against the force of the spring 95 and the pressure in the chamber 74. In the position shown in FIG. 4, the compression spring 128 biases the lever 114 clockwise about the fixed pin 116 thereby opening the valve 94, with the pressure in the chamber 74 and the force of the spring 95 assisting in opening the valve 94.

A float assembly 138 includes a generally vertical rod 140 that passes through an aperture in the second portion 118 of the lever 114. Adjustable collars 144 and 146 on the rod 140 limit vertical movement of the rod 140 relative to the lever 114 and transmit actuating force from the float assembly 138 to the lever 114. Two adjustable collars 148 and 150 limit vertical movement of a float 160 relative to the rod 140. These adjustments allow a substantial range of water levels in the sumps and precise adjustment of the water levels at which the sump pump 10 is turned on and off.

While a preferred form of the float assembly 138 has been described above, it should be understood that other configurations for the float assembly may be utilized and/or anticipated within the scope of the invention.

The invention claimed is:

1. A water powered sump pump having a specific installed orientation in a sump, the sump pump comprising:
a drain line locatable in the sump in which water may collect;
an inlet port connectable to a source of water under pressure;
a fluid outlet port in fluid communication with the drain line to draw a flow of water into the drain line from the in response to a flow of water from the fluid outlet port; and
a flow control apparatus in communication with the inlet port and the outlet port to control flow from the inlet port to the outlet port, the flow control apparatus comprises:
a passage connecting the inlet port to the outlet port,
a flow valve moveable from a closed position in which the passage is closed to an open position in which the passage is open, the flow valve biased to the closed position,
a variable pressure chamber separated from said passage by said valve,
a low volume water passage in fluid communication with the inlet port and the variable pressure chamber, and
a control valve in fluid communication with the variable pressure chamber, the control valve moveable in a valve chamber between an open position of the control valve wherein a water flow is allowed to exit the variable pressure chamber via the control valve thereby initiating movement of the flow valve from the closed position of the flow valve to the open position of the flow valve, and a closed position of the control valve wherein water cannot exit the variable pressure chamber via the control valve thereby initiating movement of the flow valve from the open position of the flow valve to the closed position of the flow valve; and
an actuator assembly comprising:
a pivotally supported actuator lever engaged with the control valve to actuate the control valve between the closed and open positions, the actuator lever mounted to pivot between a first position wherein the control valve moves to the closed position of the control valve in response to engagement with the actuator lever, and a second position wherein the control valve moves to the open position of the control valve in response to engagement with the actuator lever, the actuator lever extending longitudinally from a first portion of the actuator lever engaged against the control valve to a second portion of the actuator lever having an aperture configured for direct engagement with a float assembly to transmit force to actuate the lever between the first and second positions; and
a biasing member pivotably attached to the actuator lever and mounted for movement between a first bias position wherein the biasing member biases the actuator lever to the first position with the actuator lever in the first position and a second bias position wherein the biasing member biases the actuator lever to the second position with the actuator lever in the second position.

2. The water powered sump pump of claim 1 wherein the valve chamber has a drain outlet at a vertically lowermost position of the valve chamber to drain the water from the valve chamber with the control valve in the closed position and the sump pump oriented into the specific installed orientation.

3. The water powered sump pump of claim 1 wherein the control valve comprises a valve stem extending from the valve chamber and engaged against the first portion of the actuator lever.

4. The water powered sump pump of claim 1 wherein the control valve is biased to the closed position of the control valve.

5. The water powered sump pump of claim 1 wherein the flow valve includes a diaphragm that isolates the variable pressure chamber from the passage.

6. The water powered sump pump of claim 1 wherein the passage is defined by a first housing part, and the variable pressure chamber is defined by a second housing part fastened to the first housing part.

7. The water powered sump pump of claim 6 wherein the valve chamber is defined by the second housing part and by a third housing part engaged with the second housing part, the third housing part defining a vertically lowermost portion of the valve chamber and including a drain outlet.

8. The water powered sump pump of claim 6 wherein the actuator assembly is supported on the second housing part.

9. The water powered sump pump of claim 1 further comprising a water powered suction generating apparatus in communication with the fluid outlet port, said water powered suction generating apparatus responsive to the flow of water from the fluid outlet port to create a low pressure sufficient to entrain water from the drain line and discharge water through a fluid discharge line.

10. The water powered sump pump of claim 1 further comprising a float assembly directly connected to the second portion of the actuator lever to pivot the actuator lever from the first position to the second position in response to a predetermined rise in a water level in a sump, and to pivot the actuator lever from the second position to the first position in response to a predetermined drop in the water level in the sump.

\* \* \* \* \*